Nov. 6, 1962        J. J. CARROLL ETAL        3,061,976
PLANT SUPPORT
Filed Nov. 29, 1960

INVENTORS.
JOHN J. CARROLL
BY JAMES A. GRILLO
Robertson and Youtie
ATTORNEYS

United States Patent Office 3,061,976
Patented Nov. 6, 1962

3,061,976
PLANT SUPPORT
John J. Carroll, Cedar and MacDade Blvd., and James A. Grillo, 207 Golf Road, both of Darby, Pa.
Filed Nov. 29, 1960, Ser. No. 72,427
4 Claims. (Cl. 47—47)

This invention relates generally to a support for growing plants. The device of the instant invention has been primarily developed and employed for use in conjunction with hyacinths, and will be illustrated and described hereinafter with particular reference thereto. However, it is appreciated that the plant support of the instant invention is capable of supporting a wide variety of plants, shrubs, and other vegetation, whether grown in pots or in the ground, or indoors or outdoors.

It is one object of the present invention to provide a plant support including a stake and a band, wherein the band is quickly and easily adjustable vertically along the stake for supporting engagement with plants of different sizes, especially to insure continuing support of a plant as it grows.

It is a further object of the present invention to provide a plant support of the type described which is extremely simple in construction, durable and reliable in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
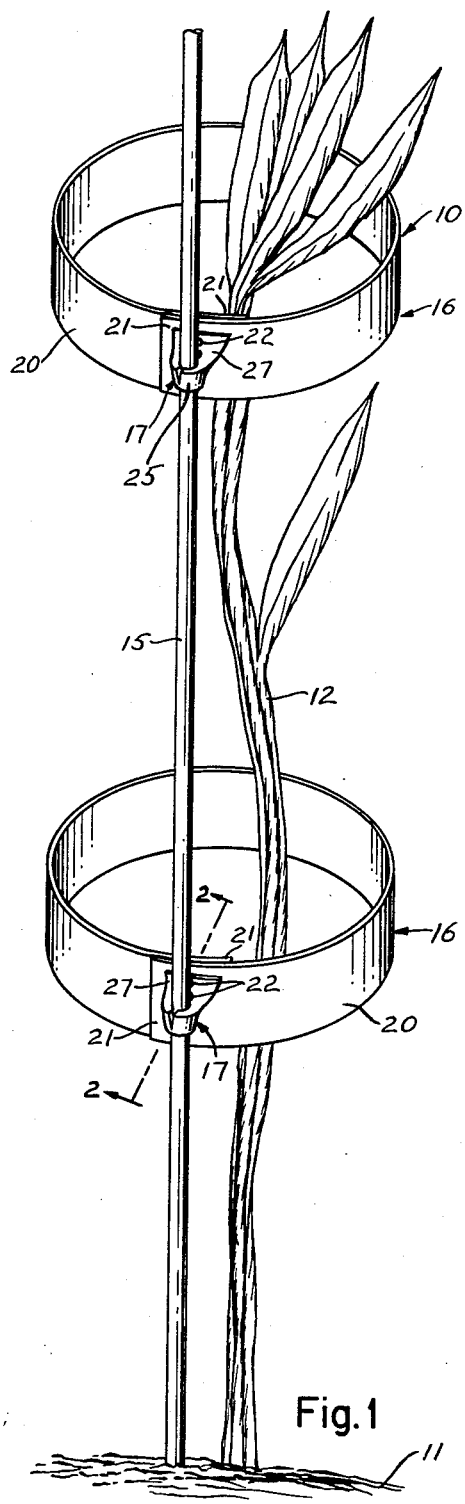
FIGURE 1 is an elevational view showing a plant support of the present invention in operative association with a growing plant.

Referring now more particularly to the drawings, and specifically to FIGURE 1 thereof, a plant support of the present invention is there generally designated 10, adapted to upstand from a ground surface 11 in supporting relation with a plant 12.

The plant support 10 includes an elongate upstanding post or stake 15, having its lower end adapted to be impaled in the ground surface 11. The stake 15 is preferably of generally cylindrical configuration, being substantially circular in cross section, and may be fabricated of wood, metal or plastic, as desired.

One or more bands 16 may be disposed generally horizontally and arranged in vertically spaced relation with respect to each other, secured to the stake 15 for receiving engagement with spaced regions of the plant 12.

Carried by each of the bands 16 is an attachment member 17 adjustably connecting the respective band to the stake 15.

Each band 16 may be formed of an elongate resiliently flexible strip bent to a circular or cylindrical configuration having its end portions 21 in overlapping facing engagement with each other. The bent strip or band 20 may advantageously be fabricated of plastic, say Celluloid, or other suitably weather-resistant and resiliently flexible material. The overlapping strip ends 21 may be secured in their facing engagement by any suitable means, such as adhesive, heat sealing, or by fasteners, as at 22.

Each attachment member 17 includes a generally cylindrical, vertically extending, open-ended sleeve 25, preferably formed of polyethylene or other suitably resiliently flexible material. Each sleeve 25 is located proximate to and exteriorly of the overlapping end portions 21 of a respective band 16, the interior opening of each sleeve extending generally vertically in parallelism with the through opening of the associated band. Each sleeve 25 is adapted to snugly and frictionally engage about or receive the stake 15. The resilient distensibility of a sleeve 25 serves to insure substantial frictional engagement between the sleeve and a received stake to insure maintenance of the sleeve at a selected position on the stake, while permitting easy adjusting movement of the sleeve to any desired position on the stake. For enhanced resilient distensibility of a sleeve 25, say to accommodate therethrough stakes 15 of different diameters, the sleeve may be provided with a slit or cut 26 extending downward from the upper sleeve end toward and terminating short of the lower sleeve end. If desired, the sleeve may be provided with a cut extending upward from the lower end and terminating short of the upper sleeve end.

Figure 2:
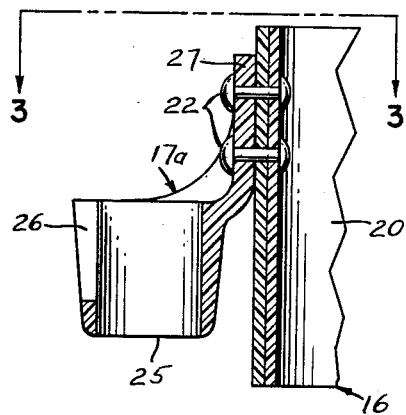
FIGURE 2 is a partial vertical sectional view taken substantially along the line 2—2 of FIGURE 1, with the stake removed.
Figure 3:
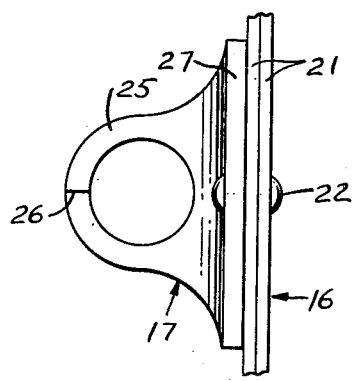
FIGURE 3 is a fragmentary top view taken generally along the line 3—3 of FIGURE 2.

Extending from one end of the sleeve 25, generally longitudinally thereof, and illustrated in FIGURES 1–3 as extending upward from the respective sleeve is an extension, tab or flap 27. The flap or tab 27 is offset radially outward from the central opening of tubular sleeve 25 and secured in facing engagement with the outer overlapping end portion 21, as by the fasteners 22. The extension tab or flap 27 is preferably formed integrally with the sleeve 25; and, the pair of securing fasteners 22 hold the attachment member 17 fast to and substantially nonrotatably with respect to the band 16.

While the strip 20 of band 16 has been illustrated and described as formed separate from and secured by fasteners 22 to an attachment member 17, it is appreciated that any suitable means may be employed for fastening the attachment member to its strip or band, say adhesive means, heat sealing, or otherwise, and that the attachment member and band may be integrally fabricated, if desired.

Thus, as shown in FIGURES 1–3, each attachment member 17 snugly receives and frictionally embraces the stake 15, and serves to maintain its associated band 16 in generally horizontal outstanding relation for supporting circumposition about a growing plant 12. As the plant grows taller, proper support may be readily afforded to the plant by mere upward shifting of each attachment member 17 on its received stake 15 to locate the associated band 16 at the desired elevation. That is, deliberate manual movement of the attachment member 17 is sufficient to easily move the same along the stake, while the frictional embracing action of the attachment members to the stake serves to effectively hold the bands in any vertical elevation selected to afford proper plant support.

Figure 4:
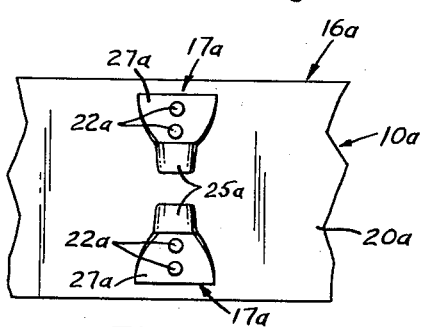
FIGURE 4 is a partial elevational view showing a slightly modified embodiment of the instant invention.

In FIGURE 4 is shown a slightly modified embodiment of plant support, generally designated 10a, wherein may be employed a band 16a of substantially larger size than that shown in FIGURES 1–3. That is, the band 16a may be fabricated of a strip 20a of greater length and width than the strip 20, as for supporting larger plants.

A pair of attachment members 17a may be secured to the band 16a in vertically spaced relation thereon. Each of the attachment members 17a may include a securement tab or flap 27a anchored in facing engagement with the external surface of band 16a, by any suitable securement means, such as fasteners 22a. Extending vertically from each flap 27a, and offset therefrom radially outward of the band 16a is an open-ended tubular member or sleeve 25a. The open-ended tubular members or sleeves 25a are in vertical alignment with each other and resiliently distensible for insertion therethrough and snug frictional engagement therewith of a stake (not shown).

In the illustrated embodiment, the tubular member or sleeve 25a of the lower attachment member 17a extends upward, while the tubular member or sleeve of the upper attachment member extends downward. Also, the sleeves 25a, while not shown as being formed with a slit or cut corresponding to slit or cut 26 of FIGURES 1–3, may be provided with such slit or cut, if desired.

The modified construction of FIGURE 4 may be fabricated of the same materials, as mentioned in connection with FIGURES 1–3. In use, a stake passes snugly through and is frictionally engaged by both of the sleeves 25a. This construction provides firmer support to permit effective utilization of a larger band 16a for supporting larger plants without undue stress or distortion of the device 10a. The latter device, although effectively retained by frictional engagement of the sleeves 25a in any selected vertical elevation on a stake, may be adjustably shifted along the stake by easy manual operation to any selected position.

From the foregoing, it is seen that the present invention provides a plant support which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A plant support comprising a stake of constant cross section for impaling in the ground proximate to a plant, a self-sustaining flexible band of closed annular configuration normally disposed generally horizontally on one side of said stake and engageable about a plant, and an attachment member exteriorly of and secured fast to said band, said attachment member being integrally fabricated of plastic material having the resilient characteristics of polyethylene and comprising a tubular open-ended circumferentially distensible sleeve in frictional engagement about said stake, and a generally flat tab extending from one end of said sleeve and secured faced in in facing engagement with the external surface of said band.

2. A plant support according to claim 1, said sleeve being formed with a longitudinal slit extending inward from one sleeve end and terminating sshort of the other sleeve end to afford increased resilient distensibility to said sleeve for frictional engagement about stakes of different sizes.

3. A plant support according to claim 1, said sleeve extending longitudinally of the axis of said band, and said tab being nonrotatably secured to said band to maintain said band generally horizontal.

4. A plant support according to claim 1, in combination with a second attachment member carried by said band in vertically spaced relation with respect to said first attachment member and embracing said stake for connection thereto, said second attachment member being integrally fabricated of plastic material having the resilient characteristics of polyethylene and comprising a second tubular open-ended sleeve circumferentially distensible for frictional engagement about said stake, and a second generally flat tab extending from one end of said sleeve and secured in facing engagement with the external surface of said band.

References Cited in the file of this patent

UNITED STATES PATENTS

| 548,508 | Bjelland | Oct. 22, 1895 |
| 1,594,195 | Henderson | July 27, 1926 |
| 1,676,337 | Kruse | July 10, 1928 |
| 2,618,902 | Prescott | Nov. 25, 1952 |
| 2,763,096 | Roger | Sept. 18, 1956 |

FOREIGN PATENTS

| 1,266 | Australia | of 1926 |
| 135,335 | Great Britain | Nov. 27, 1919 |
| 397,650 | Great Britain | Aug. 31, 1933 |
| 712,965 | Great Britain | Aug. 4, 1954 |
| 61,377 | Hungary | Oct. 11, 1913 |